US009405500B1

(12) United States Patent
Cox

(10) Patent No.: US 9,405,500 B1
(45) Date of Patent: Aug. 2, 2016

(54) PHOTO ALBUM DEVICE AND SYSTEM

(71) Applicant: Marisa Cox, Walnut Creek, CA (US)

(72) Inventor: Marisa Cox, Walnut Creek, CA (US)

( * ) Notice: Subject to any disclaimer, the term of this patent is extended or adjusted under 35 U.S.C. 154(b) by 0 days.

(21) Appl. No.: 14/025,681

(22) Filed: Sep. 12, 2013

Related U.S. Application Data

(60) Provisional application No. 61/700,009, filed on Sep. 12, 2012.

(51) Int. Cl.
*G06F 3/041* (2006.01)
*G06F 3/14* (2006.01)
*G06F 1/16* (2006.01)
*G06F 17/30* (2006.01)
*G06F 3/0484* (2013.01)
*G06T 1/60* (2006.01)

(52) U.S. Cl.
CPC ............ *G06F 3/1423* (2013.01); *G06F 1/1616* (2013.01); *G06F 3/041* (2013.01); *G06F 3/04845* (2013.01); *G06F 17/30244* (2013.01); *G06T 1/60* (2013.01)

(58) Field of Classification Search
CPC . G06F 15/0283; G06F 15/0291; G06F 3/147; G06F 2200/1631; G06F 1/1616; G06F 1/1618; G06F 3/041; G06F 3/04845; G06F 3/1423; G06F 17/30244; Y10S 345/901; G06T 1/60
USPC ............... 345/1.1, 1.3, 173, 901; 715/730; 361/679.01, 679.26–679.28
See application file for complete search history.

(56) References Cited

U.S. PATENT DOCUMENTS

| | | | | |
|---|---|---|---|---|
| 4,675,755 A * | 6/1987 | Baumeister et al. | ........... | 386/262 |
| 5,467,102 A * | 11/1995 | Kuno et al. | ..................... | 345/1.3 |
| 5,761,485 A * | 6/1998 | Munyan | ........................ | 715/839 |
| 5,847,698 A * | 12/1998 | Reavey et al. | ................. | 345/173 |
| 6,229,502 B1 * | 5/2001 | Schwab | ........................ | 345/1.1 |
| 6,313,828 B1 * | 11/2001 | Chombo | ........................ | 345/169 |
| 6,473,058 B1 * | 10/2002 | Hotomi et al. | .................. | 345/1.1 |
| 6,512,497 B1 * | 1/2003 | Kondo et al. | .................. | 345/1.1 |
| 7,079,293 B2 * | 7/2006 | Risheq | ........................... | 358/474 |
| 7,290,285 B2 * | 10/2007 | McCurdy et al. | ............... | 726/27 |
| 7,509,345 B2 * | 3/2009 | DeSpain et al. | ......... | G06F 17/24 |
| 8,024,658 B1 * | 9/2011 | Fagans et al. | ................ | 715/730 |
| 8,078,969 B2 * | 12/2011 | Harrison | ........................ | 715/732 |
| 8,229,941 B2 * | 7/2012 | Ohwa et al. | ..................... | 707/758 |
| 2002/0035697 A1 * | 3/2002 | McCurdy et al. | ........... | 713/200 |
| 2003/0090498 A1 * | 5/2003 | Schick et al. | ................. | 345/661 |
| 2004/0100486 A1 * | 5/2004 | Flamini et al. | ................ | 345/723 |
| 2004/0133924 A1 * | 7/2004 | Wilkins et al. | ................ | 725/135 |
| 2004/0201871 A1 * | 10/2004 | Risheq | ........................... | 358/474 |
| 2004/0205646 A1 * | 10/2004 | Sachs et al. | .................... | 715/530 |
| 2005/0097081 A1 * | 5/2005 | Sellen et al. | ....................... | 707/3 |
| 2005/0165726 A1 * | 7/2005 | Kawell et al. | ..................... | 707/1 |
| 2005/0273470 A1 * | 12/2005 | Heigold | ..................... | 707/104.1 |
| 2006/0004699 A1 * | 1/2006 | Lehikoinen et al. | ................. | G06F 17/30038 |
| 2006/0047811 A1 * | 3/2006 | Lau et al. | .............. | H04L 12/586 709/225 |

(Continued)

*Primary Examiner* — Lun-Yi Lao
*Assistant Examiner* — Peter D McLoone
(74) *Attorney, Agent, or Firm* — West & Associates, A PC; Stuart J. West; Shaun N. Sluman

(57) ABSTRACT

A photo album device comprising two hingeably coupled touchscreens. The photo album device comprises a memory storage device configured to store a collection of digital images and other files. The photo album device is configured to display albums of images and other files, and allow a user to edit the albums. The digital files can be backed up to an external device.

11 Claims, 9 Drawing Sheets

(56) References Cited

U.S. PATENT DOCUMENTS

| | | | |
|---|---|---|---|
| 2006/0075353 A1* | 4/2006 | DeSpain et al. | G06F 17/24 715/770 |
| 2007/0030605 A1* | 2/2007 | Treu | B42D 3/123 434/319 |
| 2007/0133055 A1* | 6/2007 | Johnson | 358/1.18 |
| 2008/0222560 A1* | 9/2008 | Harrison | 715/800 |
| 2008/0231740 A1* | 9/2008 | McIntyre et al. | 348/333.01 |
| 2008/0231741 A1* | 9/2008 | McIntyre et al. | 348/333.01 |
| 2009/0240688 A1* | 9/2009 | Ohwa et al. | 707/5 |
| 2010/0131851 A1* | 5/2010 | Reese et al. | 715/732 |
| 2010/0164836 A1* | 7/2010 | Liberatore | 345/1.1 |
| 2011/0096014 A1* | 4/2011 | Fuyuno et al. | G06F 1/1616 345/173 |
| 2011/0102354 A1* | 5/2011 | Fuyuno et al. | G06F 1/1616 345/173 |
| 2014/0365851 A1* | 12/2014 | Kroupa | G06F 17/2229 715/205 |

* cited by examiner

PHOTO ALBUM DEVICE AND SYSTEM

CLAIM OF PRIORITY

This Application claims priority under 35 U.S.C. §119(e) from earlier filed U.S. Provisional Application Ser. No. 61/700,009, filed Sep. 12, 2012, by Marisa Cox, the entirety of which is incorporated herein by reference.

BACKGROUND

1. Field of the Invention

The present disclosure relates to the field of digital photo albums, particularly a digital photo album device capable of storing, organizing, and displaying digital pictures.

2. Background

Viewing photo albums have been a method of enjoying and reliving memories for generations. Many people enjoy assembling photo albums to collect, organize, and display their photographs of vacations, family celebrations, school events, childhood memories, and other life events. It can be a treasured experience for families to go through photo albums together. For example, it can be an intimate and enjoyable family experience for a parent and child to curl up on a couch with a photo album to view family photos, with the parent explaining family history through the photos or describing events that the child was too young to remember.

In the past, most photographs were taken on film. Photographers generally then developed the entire roll of film, which resulted in the photographer receiving physical paper copies of each and every picture he or she had taken. These physical prints were easy to insert into photo album pages, and therefore a photo album was both a practical way to physically organize and store the pictures, as well as a convenient way to display and view them.

However, recently it has become more common to take pictures digitally with a dedicated digital camera, or with a digital camera that is incorporated into a mobile phone or other device. Photographers often take many more pictures of an event with digital cameras than they would with film cameras, because there is no expense associated with buying rolls of film. This can result in a large collection of pictures for every event that is photographed. These digital pictures initially exist only as bits of information on a memory storage device, and must be printed out if one desires to have physical copies of the pictures. Although services and photo printers exist that can print physical copies of digital photographs, due to the potentially large number of pictures taken it can be expensive and/or impractical to print out physical copies of every picture. Consumers instead often select individual pictures that they would like to have printed, but this process can be inconvenient and time consuming. As a result, digital pictures often remain trapped on memory cards, hard drives, or other storage devices. Additionally, a single photographer can often have digital pictures stored on a variety of devices, such as a mobile phone, camera, computer, or other device, and never take the time to copy them all to a single location.

Services exist that allow users to upload their pictures and create photo albums that are then printed for them. However, these solutions share the problems that it can take time and effort to select the specific pictures to be used, upload them, and then arrange them into a photo album that must then be purchased and shipped to the user. While many users desire to have these types of photo albums, they often never find the time to prepare them.

Digital devices such as computers, mobile phones, tablet computers, digital frames, and other such devices can store and display digital pictures. However, these types of devices often have drawbacks over the simplicity of traditional photo albums.

Some computers have large enough hard drives to store a user's entire collection of pictures. However, the experience of viewing those pictures on the computer's screen falls far short of the traditional photo album experience. Computers generally only display one image at a time, in comparison to a photo album page that can have many pictures on it. It can also be cumbersome to sit down with a child to show pictures to him or her on a computer. These problems also exist with pictures uploaded to websites.

Additionally, computers and other digital devices can be capable of running multiple programs or applications at the same time. The multipurpose nature of these devices can intrude on the experience of viewing a photo album. For example, a family can gather around a computer to view photos but be interrupted when an alert pops up indicating that an email has been received. Similarly, users can be easily distracted from the task of organizing or viewing digital photo albums due to the temptations of other tasks or activities that the digital device can perform.

Many other devices, such as mobile phones, tablet computers, and digital frames, have limited storage space. This limitation requires a user to select which photos to load onto the device, which can be time consuming. When only a subset of the user's entire collection of pictures is on each device, the entire collection can become fragmented and disorganized.

What is needed is a device for storing, organizing, and displaying a user's entire collection of pictures. The device can have two screens arranged side by side, which can emulate the intimate and dedicated photo viewing experience of a traditional photo album.

DETAILED DESCRIPTION

Figure 1:
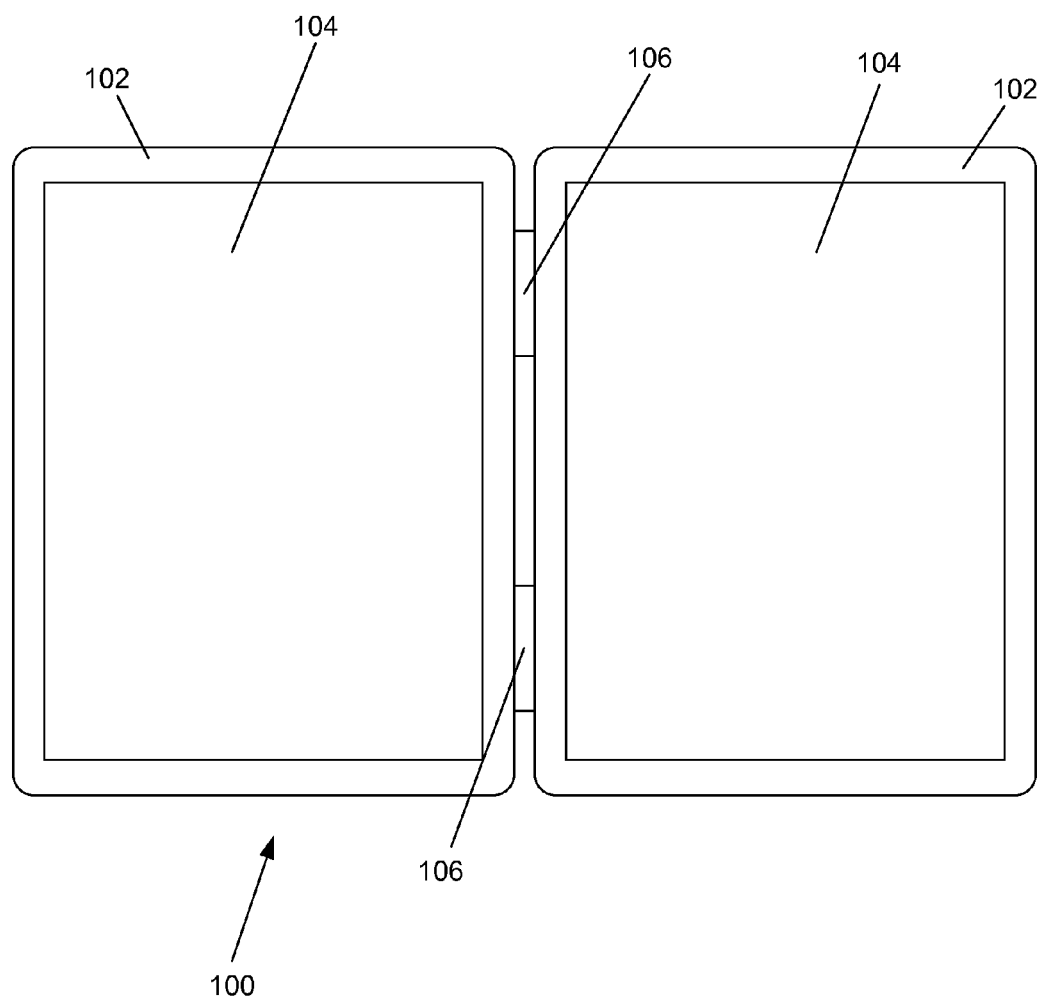
FIG. 1 depicts a view of an embodiment of a photo album device in an open position.

FIG. 1 depicts an embodiment of a photo album device 100. In some embodiments, the photo album device 100 can comprise two panels 102. Each panel 102 can comprise a screen 104. In some embodiments, one or more of the photo album device's screens 104 can be a touchscreen capable of detecting single and/or multiple touches from fingers, styluses, or other input mechanisms. In some embodiments, the screens 104 can be capacitive touchscreens. In other embodiments, the screens 104 can be other types of touchscreens, such as resistive, infrared, surface wave acoustic, optical imaging, dispersive signal detecting, acoustic pulse recognizing, or any other type of touchscreen. In alternate embodiments, one or more of the photo album device's screens 104 can be a non-touch screen, such as an LCD screen, LED screen, or any other type of screen.

Each panel 102 can comprise a housing partially surrounding the panel's screen 104 and covering internal components within the panel 102. The housing can be comprised of plastic, metal, leather, wood, or any other desired material. In some embodiments, the housing and/or panel can be further partially surrounded by a casing. The casing can provide decorative and/or protective elements to the panel 102. In these embodiments, the casing can be made of plastic, leather, fabric, foam, or any other desired material. In some embodiments the casing can be removable from the housing, while in other embodiments the casing can be permanently coupled with the panels 102. In some embodiments, the panel 102 can comprise one or more handles.

Figure 2:
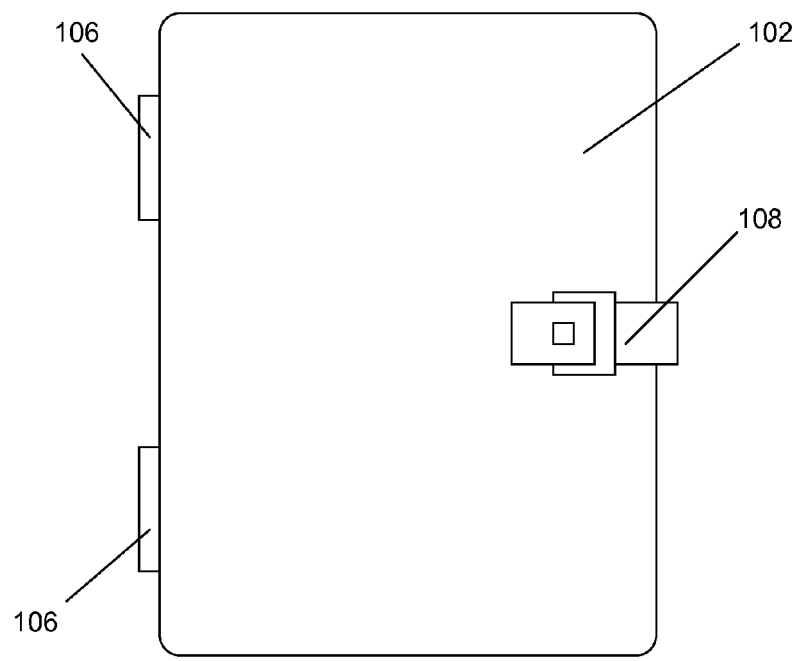
FIG. 2 depicts a view of an embodiment of a photo album device in a closed position.

In some embodiments, the panels 102 coupled with one another by one or more hinges 106. The panels 102 can be rotated about the one or more hinges 106 to move the photo album device 100 into an open position by moving the panels 102 apart such that the panels 102 are side by side as shown in FIG. 1, or to move the photo album device 100 into a closed position by moving the panels 102 face to face such that the screens 104 are facing each other, as shown in FIG. 2. In some embodiments, the panels' housing, casing, and/or bumpers on the panels proximate to the screens 104, can prevent the screens 104 from touching one another when the photo album device 100 is in the closed position.

Figure 3A:
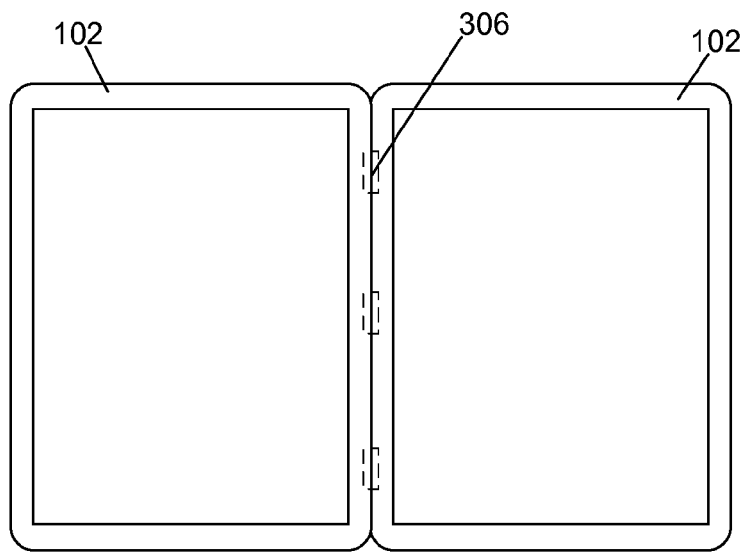
FIGS. 3A and 3B depict views of an alternate embodiment of a photo album device wherein the panels are separable.
Figure 3B:
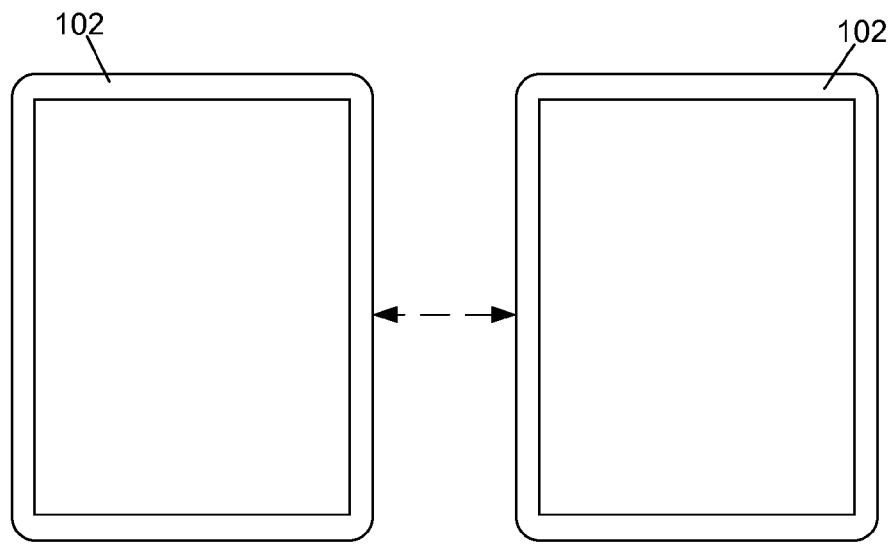

In alternate embodiments, the panels 102 can be separable from one another. By way of a non-limiting example, FIGS. 3A and 3B depict an embodiment in which the two panels 102 each comprise one or more magnetic connectors 306 on one of their edges. As can be seen from FIG. 3A, in this embodiment the panels 102 can be selectively coupled side by side by placing the magnetic connectors 306 of the panels 102 next to each other, while the panels 102 can be separated by detaching the magnetic connectors 306 as shown in FIG. 3B.

Figure 4:
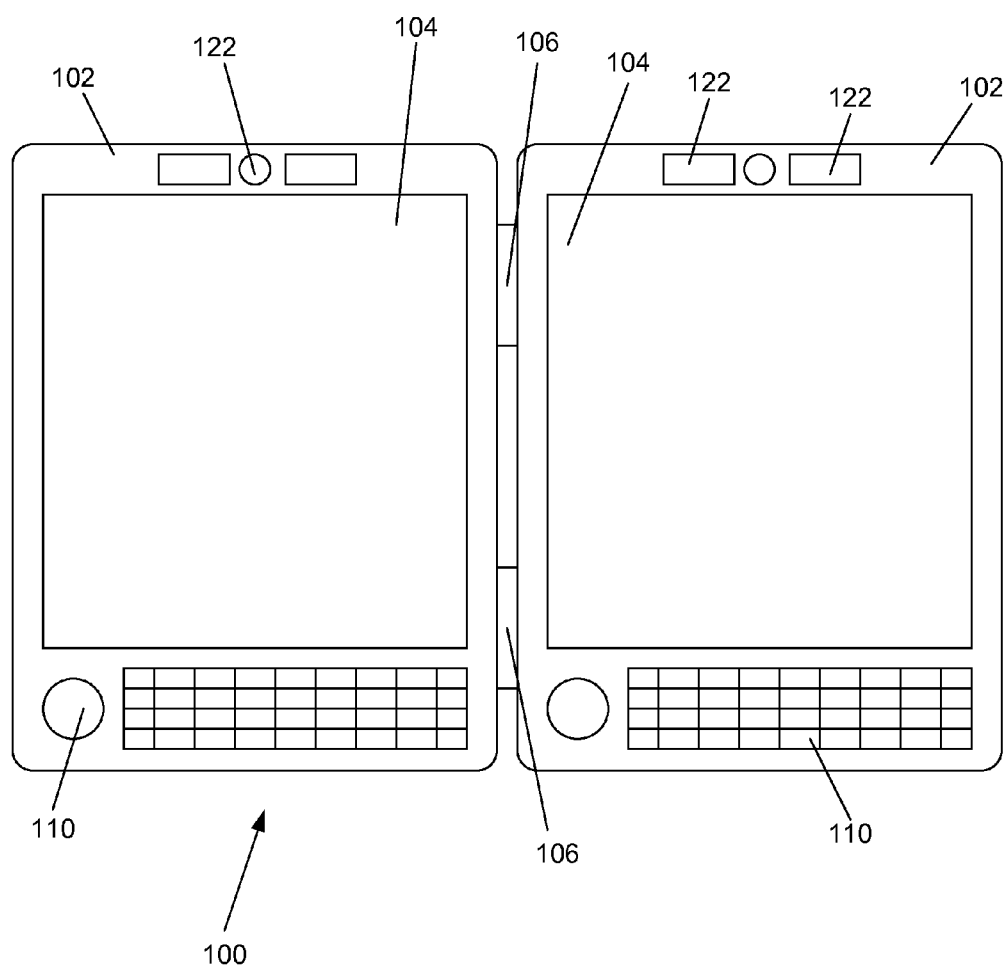
FIG. 4. depicts a view of an embodiment of a photo album device comprising input mechanisms and other hardware components.

In some embodiments comprising touch screens, the screens 104 can be the primary mechanism for a user to interact with the photo album device 100. By way of non-limiting examples, in some embodiments users can tap on a keyboard displayed on one of the screens 104 to input text, slide fingers on the screens 104 to manipulate digital images, or use fingers or styluses to interact with other elements of the photo album device 100 displayed on the screens 104 as described below. In alternate embodiments, one or more of the screens 104 can be non-touchscreens, and one or both of the panels 102 can comprise one or more input mechanisms 110, as shown in FIG. 4. The input mechanisms 110 can be keyboards, trackpads, buttons, wheels, joysticks, and/or any other type of input device that can be used by a user to interact with the photo album device 100. In some embodiments, both touchscreens and/or one or more other input mechanisms 110 can be present.

In some embodiments, the panels 102 can each comprise a corresponding closure device 108 which can be secured to each other to keep the photo album device 100 in the closed position with the screens 104 facing one another. The corresponding closure devices 108 can be latches, snaps, locks, belts, or any other connection mechanism. By way of a non-limiting example, FIG. 2 depicts an embodiment in which the corresponding closure devices 108 are a belt and belt buckle.

Figure 5:
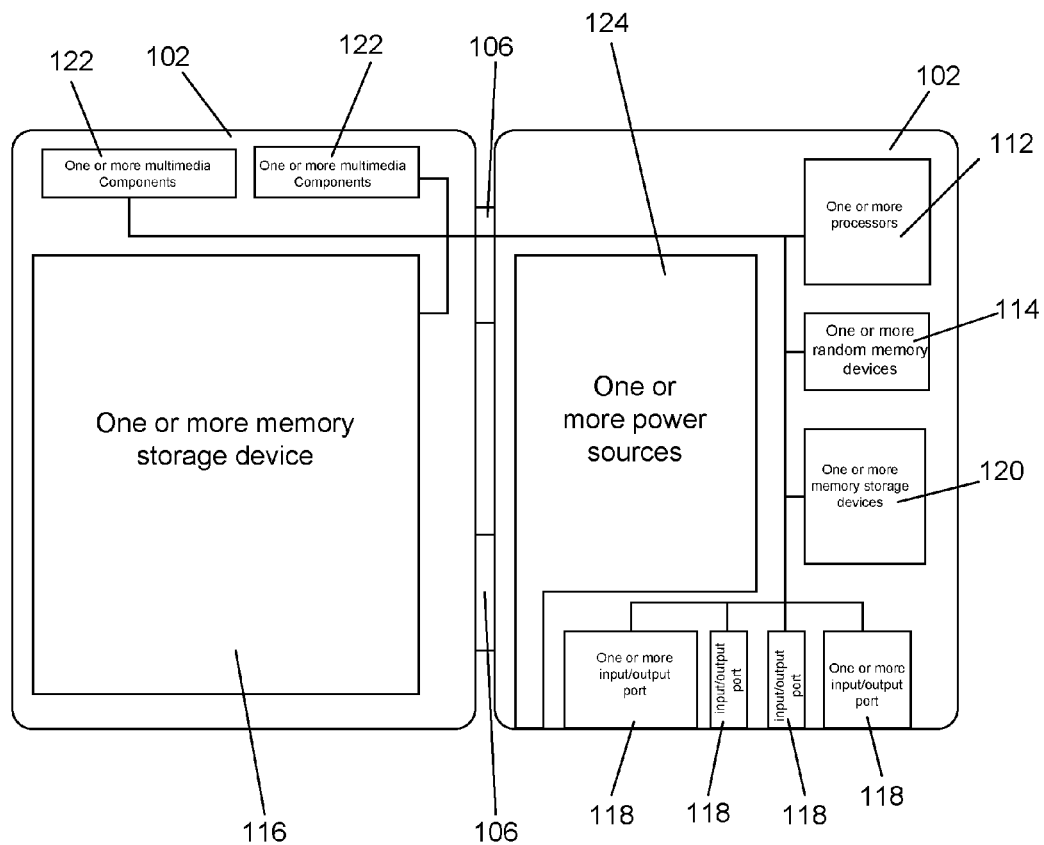
FIG. 5 depicts an internal view of an embodiment of a photo album device.
Figure 6:
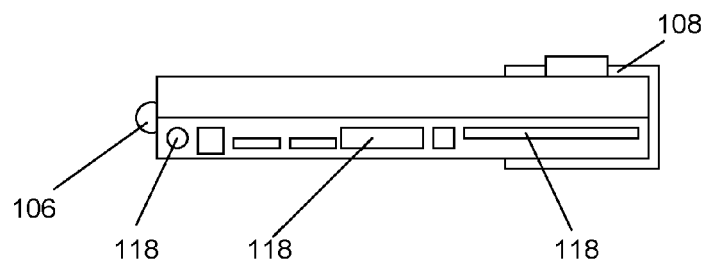
FIG. 6 depicts a side view of an embodiment of a photo album device in a closed position.

FIG. 5 depicts an internal view of an embodiment of the photo album device 100, and FIG. 6 depicts a side view of an embodiment of the photo album device 100 in the closed position. The photo album device 100 can comprise a plurality of internal components housed within one or both of the panels 102. The internal components can be one or more processors 112, one or more random access memory devices 114, one or more memory storage devices 116, one or more input/output ports 118, one or more networking components 120, one or more multimedia components 122, one or more power sources 124, and/or any other component. Each internal component can be in communication with one or more other internal components and/or the screens 104.

In some embodiments, the internal components can be in communication with one another through connections passing through the hinges 106, such that the internal components and/or screen 104 of one panel 102 can communicate with the internal components and/or screen 104 of the other panel 102. By way of a non-limiting example, FIG. 5 depicts an embodiment in which the photo album device 100 comprises a single processor 112 in the right panel 102 and a single memory storage device 116 in the left panel, and the processor 112 can be in communication with the memory storage device 116 through the hinge connection.

In alternate embodiments, each panel 102 can have its own instances of some or all of the internal components. By way of a non-limiting example, in some embodiments each panel 102 can comprise its own processor 112, random access memory device 114, memory storage device 116, input/output ports 118, networking components 120, multimedia components 122, and/or power sources 124.

In other embodiments in which the panels 102 are selectively separable, such as the embodiment shown in FIGS. 3A and 3B, the internal components of one panel 102 can be in communication with the internal components of the other panel 102 through a wireless connection, such as a WiFi or Bluetooth connection, such that the panels 102 can operate independently but still be linked. By way of a non-limiting example, in some embodiments one panel 102 can comprise a memory storage device 116 while the other panel 102 comprises a processor 112. In this example, the panels 102 can be separated and be used independently, with the processor 112 of one panel 102 controlling the operations of both panels 102, and the memory storage device 116 of one panel 102 being accessible by both panels 102. In this embodiment, when the panels 102 are connected together as shown in FIG. 3A, the photo album device 100 can be locked into the photo album system mode described below with respect to FIG. 8, while when the panels are separated as shown in FIG. 3B, the separate panels 102 can be used as independent tablet computers, or be used in conjunction with one another. By way of non-limiting examples, one panel 102 can at least partially mirror the display of the other panel 102, such that a parent can use one panel 102 to monitor and/or approve their child's activities on the other panel 102 from a different location; or provide audiovisual or other content from one panel 102 to the other panel 102, such as videoconferencing, baby monitor capabilities, multiplayer game interactions, or other linked interactions between the panels 102.

The one or more processors 112 can be central processing units, graphics processing units, reduced instruction set computing (RISC) processors, or any other types of processors that can control one or more functions of the photo album device 100. The processors 112 can be in communication with one or more of the other internal components, one or both screens 104 and/or other processors 112. In some embodiments, one or more processors 112 can receive input from the screens 104 and/or other input mechanisms 110, and/or control what is displayed on the screens 104. The one or more random access memory devices 114 can be any type of temporary memory, such as SRAM, DRAM, or any other type of memory.

The one or more memory storage devices 116 can be configured to store data, such as digital files, media files, digital images, video files, audio files, software, firmware, configuration data, drivers, and/or other types of data. By way of a non-limiting example, digital images can be stored on the memory storage devices 116 in file formats including .jpg, .gif, .png, .raw, .tiff, .bmp, or any other file format. In some embodiments, the memory storage device 116 can be flash memory. In other embodiments, the memory storage device 116 can be a solid state drive, hard disk drive, or any other type of data storage device. In some embodiments, the memory storage device 116 can any desired capacity, such as 32 GB, 64 GB, 1 TB, or any other capacity. By way of a non-limiting example, in some embodiments the memory storage device 116 can have a capacity large enough to store hundreds of thousands of digital images and/or hundreds of hours of digital video files.

Figure 7:
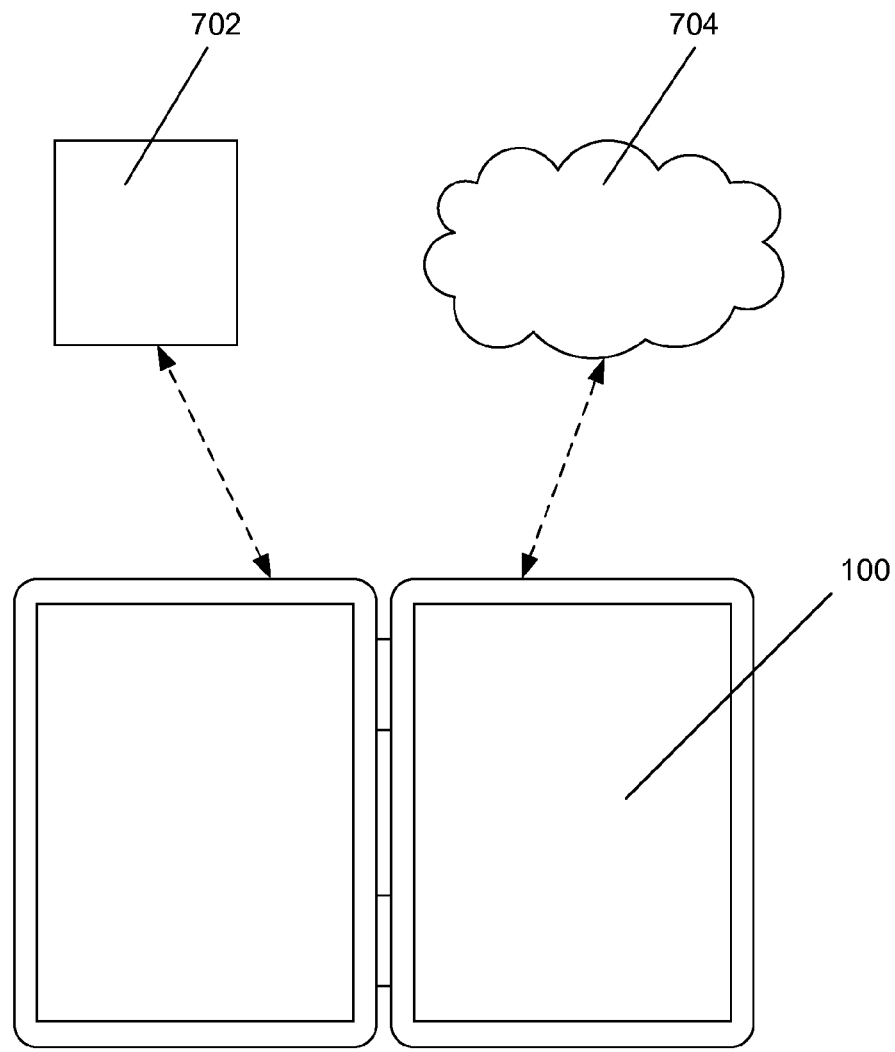
FIG. 7 depicts a view of an embodiment of a photo album device in communication with one or more external data storage devices.

In some embodiments, the photo album device 100 can be linked with a wired or wireless data connection to one or more external data storage devices 702 or systems in addition to, or in place of, the memory storage devices 116. The external data storage device 702 can be a local data storage device 702*a* or a cloud storage device 702*b*. By way of a non-limiting example, FIG. 7 depicts an embodiment of the photo album device 100 in communication with two external data storage devices 702: a local data storage device 702*a* and a cloud storage device 702*b*. Local data storage devices 702*a* can be external hard drives, removable media cards, removable optical discs, removable flash drives, or any other external and/or removable data storage device. Cloud storage devices 702*b* can be servers, hard drives, and/or other data storage devices that are located remotely and are accessible over a network. By way of a non-limiting example, the photo album device 100 can be linked with a remote server over the internet. The external data storage devices 702 can be configured to store more data than the memory storage devices 116 within the photo album device 100, such that the photo album device can have access to additional and/or alternate digital storage space. By way of a non-limiting example, in some embodiments the memory storage devices 116 within the photo album device 100 can have a 32 GB capacity, but when more space is needed beyond the 32 GB capacity, the photo album device 100 can store and access files on a cloud storage device 702*b* with a 1 TB capacity.

One or more of the input/output ports 118 can be USB ports, memory card slots, optical media reader, or any other slot, port, bay or connection point capable of allowing the photo album device 100 to connect to and be in data communication with a separate device or media component, such as a digital camera, camera memory card, mobile phone, CD, DVD, Blu-Ray disc, computer, external hard drive, external optical drive, external scanner, flash drive, or any other device or data storage unit. Digital images and/or other data or information can be transferred between the separate device and one or more of the memory storage devices 116 of the photo album device 100 via one or more of the input/output ports 118. One or more of the input/output ports 118 can be capable of sending and/or receiving an analog or digital signal to an external device, such as: VGA ports or HDMI ports for connecting to an external monitor; audio jacks for connecting to audio devices including external microphones, speakers, or headphones; or any other type of signal connection port. In some embodiments, apertures in the housing and/or casing of the panels 102 can allow a user to access the input/output ports 118 from the exterior of the photo album device 100, as shown in FIG. 6.

The one or more networking components 120 can be wired or wireless networking devices capable of sending and/or receiving data. The networking components 120 can communicate with and/or exchange data with other devices. Wireless networking devices can be WiFi 802.11 devices, Bluetooth devices, cellular devices, mobile telecommunications devices, including 3G and 4G devices, WiMax devices, and/or any other wireless networking device. Wired networking devices can be Ethernet devices, modems, or any other wired networking device. In some embodiments, apertures in the housing and/or casing of the panels 102 can allow a user to access wired networking devices from the exterior of the photo album device 100. Digital images and/or other data or information can be transferred between other devices on a network and/or the internet and one or more of the memory storage devices 116 of the photo album device 100 via one or more of the networking components 120.

The one or more multimedia components 122 can be devices capable of playing, indicating, receiving, or capturing audio and/or visual data, such as microphones, cameras, speakers, or any other multimedia device. In some embodiments, apertures in the housing and/or casing of the panels 102 can allow a user to hear, see, or interact with the multimedia components 122 from the exterior of the photo album device 100, as shown in FIG. 4.

The one or more power sources 124 can be capable of providing power to the components of the photo album device 100. In some embodiments, one or more of the power sources 124 can be a cord and/or plug connected with an external power source, such as a wall outlet, USB device, or any other type of power source. In some embodiments, one or more of the power sources 124 can be rechargeable batteries, such as lithium ion batteries. In some rechargeable embodiments, the rechargeable batteries can be charged while the cord and/or plug is connected with an external power source. In alternate embodiments, one or more of the power sources 124 can be removable and/or replaceable batteries.

Figure 8:
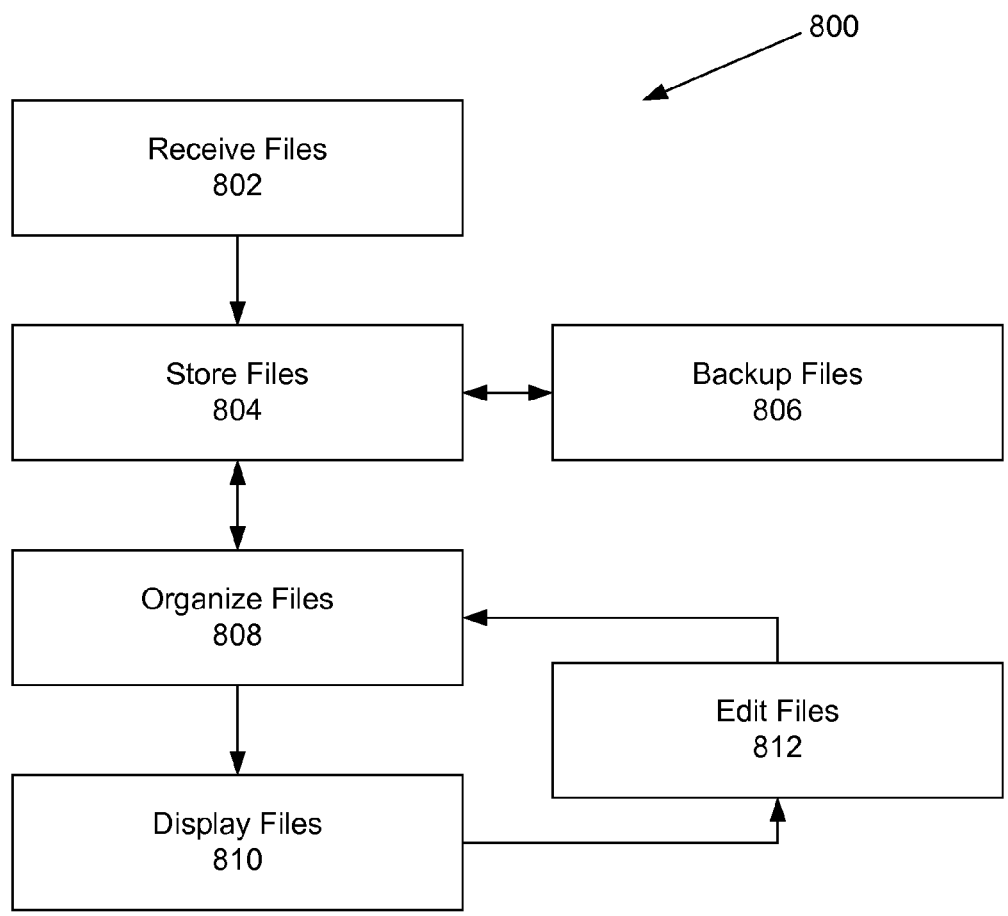
FIG. 8 depicts a flow chart of a system for organizing, storing, and displaying digital files stored on an embodiment of a photo album device.

FIG. 8 depicts a system 800 for organizing, storing, and displaying digital files 902 stored on the one or more memory storage devices 116 on the photo album device 100. The system 800 can be software and/or firmware stored on one or more of the memory storage devices 116. In some embodiments, the photo album device 100 can be configured to solely operate the system 800, without other programs, applications, or notifications that are not related to the system 800 being accessible by a user through the photo album device 100. In alternate embodiments, the system 800 can be accessed as an application or program on the photo album device 100 along with other applications or programs. In some embodiments, the system 800 can comprise a graphical user interface configured to be controlled by a user via the screens 104 and/or input mechanisms 110.

Figure 9:
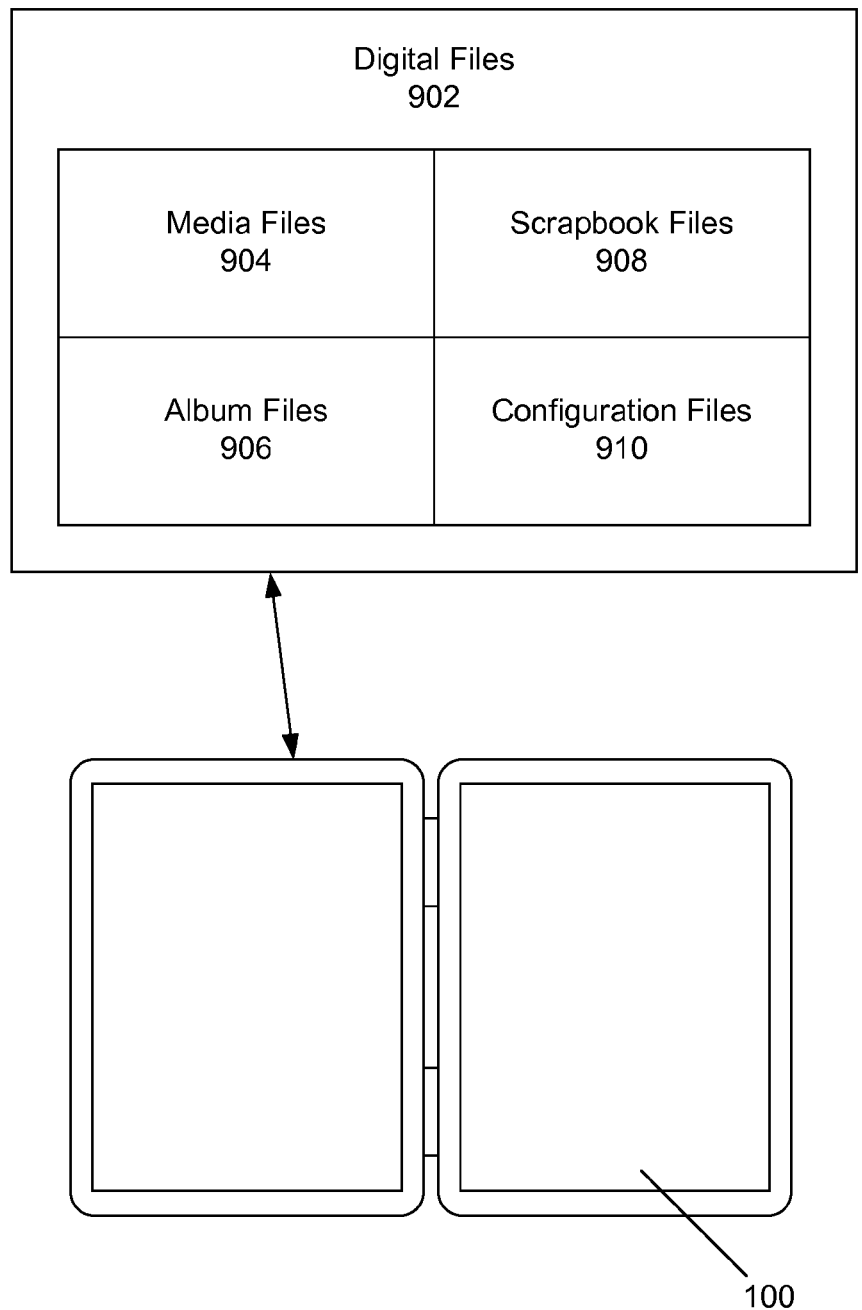
FIG. 9 depicts embodiments of digital files capable of being stored on a photo album device.

At step 802, the photo album device 100 can receive one or more digital file 902. As shown in FIG. 9 the digital files 902 can be media files 904, album files 906, scrapbook files 908, and/or configuration files 910. The photo album device 100 can receive the one or more digital files 902 through one or more data connections, such as through USB ports, from an optical disc reader, from a media card reader, and/or through a wireless connection. At step 804, the digital files 902 received by the photo album device 100 in step 802 can be stored on the memory storage devices 116 and/or external data storage devices 702.

Media files 904 can be image files, audio files, video files, or any other type of media file. Media files 904 can be transferred to the photo album device 100 from one or more sources through the input/output ports 118, networking components 120, and/or multimedia components 122. By way of a non-limiting example, a user can transfer media files 904 to a single photo album device 100 from multiple sources, including a mobile phone, computer, camera, and a website.

Configuration files 910 can maintain information about the other digital files 902 loaded onto the photo album device 100, including: metadata about the data, time, and/or location of a digital image or other information; data about the edited status of a digital file 902, such as the rotation angle of a digital image, what border has been selected for a digital image, or any other status; data about which people have been tagged in a digital image; data about an album a media file 904 has been placed into; and/or any other information about the digital file 902. In some embodiments, the configuration files 910 can be loaded with the digital files 902 or created when the digital files 902 are loaded during steps 802 and/or 804. In other embodiments, configuration files 910 can be added or edited at any time by a user.

Album files 906 can maintain information about which media files and/or scrapbook files 908 are associated with a particular album. An album can be a collection of one or more media files 904 and/or scrapbook files 908. Albums can be displayed on one or both screens 104 as a collection of pages, with the user having the ability to flip between pages. In some embodiments, all files associated with a particular album can be saved together in a directory in the memory storage device 116. In alternate embodiments, album files 906 can identify media files 904 and/or scrapbook files 908 that have been associated with a particular album, regardless of the directory in which they have been saved.

Scrapbook files 908 can be text, such as headlines or captions, and/or decorative images, such as glitter, patterns, shapes, stamps, clip art, borders, backgrounds, and/or any other decoration. A selection of scrapbook files 908 can be preloaded on the memory storage devices 116. In some embodiments, a user can purchase and/or download additional scrapbook files 908 onto the photo album device 100 from the internet. By way of non-limiting examples, in some embodiments users can download themed collections of scrapbook files 908 comprising art relating a holidays, birthdays, vacations, or other events.

At step 806, the digital files 902 on the memory storage devices 116 can be backed up to a backup device. In some embodiments, the backup device can be an external data storage device 702. By way of a non-limiting example, at step 806 the digital files 902 can be backed up over the internet to a cloud storage device 702b. By way of other non-limiting examples, at step 806 the digital files 902 can be backed up to local data storage devices 702a such as external hard drives, optical discs, flash memory drives, or any other device. In some embodiments, the backup at step 806 can occur automatically without instruction by a user, such as uploading digital files to a cloud storage device 702b automatically once the digital files 902 have been loaded onto the photo album device 100. In other embodiments, the user can instruct the photo album device 100 to perform a backup. Backed up digital files 902 can be restored to the photo album device 100, for example if the photo album device 100 fails, to transfer the files to a new photo album device 100, to share files between photo album devices 100, or for any other desired reason. In some embodiments, the photo album device 100 can also transmit or share albums and/or individual digital files 902 over email, to websites, to social media networks, or to any other desired location.

At step 808, the photo album device 100 can organize the digital files 902. In some embodiments, the photo album device 100 can create default organization information based on the metadata of the digital files 902. By way of a non-limiting example, the photo album device 100 can sort media files 904 based on the dates that the files were created. In some embodiments, organizing the digital files 902 can comprise grouping media files 904 into albums and creating or updating album files 906 to associate the media files 904 with the albums.

In some embodiments, the photo album device 100 can create default albums based on the metadata of the files, such as by associating media files 904 that have a common parameter with a new album file 906. By way of non-limiting examples, default albums can include photos and videos taken on the same date, or photos and videos of the same person. In some embodiments, the photo album device 100 can have facial recognition software that is configured to analyze digital images and/or video to detect faces. The photo album device 100 can update the metadata of the media files 904 with a name or identifier of each person whose face is detected within the media file 904. That metadata can be used to search for photos of a particular person, generate a default album of photos of the same person, or for any other reason.

At 810, the digital files 902 can be displayed on one or more of the screens 104. In some embodiments, one or more of the digital files 902 associated with an album can be displayed on the screens 104. By way of a non-limiting example, a user can search for all photos of her daughter and the photo album device 100 can search all files loaded on the memory storage devices 116 and display a default album of all pictures showing the user's daughter. By way of another non-limiting example, a user can choose a specific album to load and display. In other embodiments, a single photo can be displayed apart from an album. In some embodiments, the media files 904 associated with an album can be displayed in a layout with multiple media files 904 on a single screen 104, such as emulating the layout of a scrapbook or traditional photo album. In some embodiments, when a video file is loaded it can be displayed across both screens 104 with each screen 104 showing half the video, displayed on a single screen 104, or be displayed in a window on a portion of one or both screens 104. The photo album device 100 can accept input from a user to select and/or change the display mode of single media files and/or albums of multiple media files.

At step 812, a user can edit the digital files 902 displayed on the screens 104. In some embodiments, the user can edit individual digital files 902, such as rotating images, changing the contrast of images, zooming images in or out, tagging pictures with the names of individuals shown in the pictures, or changing any other aspect of the digital files 902. In some embodiments, the user can also edit albums. For example, the user can organize and/or rearrange the selection of files associated with the album, disassociate and/or delete specific files from the album, add new media files 904 to the album, add or edit scrapbook files 908 to the album, such as adding captions, borders, backgrounds, glitter patterns, or any other design. In some embodiments, the user can use the multimedia components 122 to add multimedia aspects to the album, such as recording an audio description of a photo or event.

The edited media files 904 and/or album files 906 can be organized at step 808 and/or saved to the memory storage devices 116 at step 804. The edited files and albums can also be backed up at step 806. When the media files 904 and/or albums are next displayed, the photo album device 100 can display the edited versions of the media files 904 and/or albums.

In some embodiments, the media files 904 stored on the photo album device 100 can be optimized for the resolution of the screens 104 if the media files 904 are loaded at a higher resolution than the screens 104 can display to preserve storage space within the photo album device 100, while the original image is uploaded to an external data storage device 702 during backup at step 806. By way of a non-limiting example, in some embodiments the screens 104 can have a 72 ppi (pixels per inch) resolution, and when a 300 ppi digital image is loaded onto the photo album device, the original file can be uploaded to a cloud storage device 702b while an optimized 72 ppi copy of the image is saved to the photo album device's internal memory storage devices 116. When the user desires to edit the image during step 812, the original file can be loaded from the external data storage device 702. By way of a non-limiting example, if an optimized 72 ppi copy of an image has been saved to the internal memory storage device 116, but a user desires to zoom in on the image or enlarge it, the original file can be downloaded from the cloud storage device 702b for editing. An optimized version of the edited file can then be saved to the memory storage device 116, while a copy of the edited file can uploaded to the external data storage device 702. The original file can be maintained on the external data storage device 702 as a master file even if other edited copies are also being stored, such that the image on the photo album device 100 can be reverted to its original state even after significant editing by loading the original file from the external data storage device 702.

The method of FIG. 8 can be used to create and/or edit albums on the photo album device 100. Due to the inherent creative nature of a user's choices during the creation or editing of a photo album and the various options and features that a user can decide to use while operating the photo album device 100, a selection of non-limiting examples will be discussed below. However, it should be appreciated that a user can choose to use only some of the features discussed below while operating the photo album device 100.

The user can select an option on one of the screens 104 to create a new album. The photo album device 100 can allow the user to name the album and/or select which photos, videos, or audio files should be associated with the album. In some embodiments, the user can select individual files and/or have the photo album device 100 auto-populate the new album with photos by searching for photos of a particular person or event that are stored on the memory storage device 116 or on a linked remote storage device. By way of a non-limiting example, the user can create new albums for a "Summer Trip to Italy" and the "First Day of School," and associate images of those events with the albums. The photo album device 100 can use the digital images' metadata to arrange the photos in chronological order within the album. The user can then choose to rearrange the order of the photos within the album if desired.

The photo album device 100 can display options to the user when generating a new album regarding the album's theme and/or layout. For example, the photo album device 100 can present options for one or more default layouts. In some embodiments, one default layout can have pages with a white background, three photos on each page, and text boxes next to each photo, while a different default layout can have pages with a colored background, five photos on each page, and no text boxes. The user can choose between default layouts at any point, even after the album has been created, or can customize any individual aspects of the album layout.

In some embodiments, the user can change the background color by selecting a color from a color wheel or color picker, change the background to an image or pattern by selecting from media files 904 on the photo album device or external data storage device 702. By way of non-limiting examples, the user can select a background from a selection of designs, such as stripes, dots, zig-zags, rainbows, clouds, or any other design.

The user can add, delete, edit or rearrange media files 904 on album pages or reorganize media files 904 between album pages. By way of non-limiting examples, individual images can be edited to zoom in or out, change colors, brightness, or contrast, or cropping the images into preselected or customized shapes. For instance, a rectangular image can be cropped into the shape of a star, heart, oval, circle, or any other custom shape.

Media files 904 of different types can be displayed and/or added to the same album page. By way of a non-limiting example, a video file taken with the photo album device's camera can be added alongside a selection of images, and the user can choose to view the video file when browsing through the album. A user can choose to add audio files such as music or narration to an album or album page. In some embodiments a user can hold their finger on one of the touchscreens for a predetermined period of time to enable recording audio through multimedia components 122. By way of a non-limiting example, a recording of a child's voice can be captured using the photo album device's microphone, and the recording can be played later through the photo album device's speakers when browsing through the album. By way of another non-limiting example, an audio file such as an .mp3 song can be associated with an album, such that the song plays during the viewing of a particular page or throughout the entire album. In other embodiments, the photo album device 100 can allow a user to select and play any song or selection of songs during album viewing.

The user can add and/or edit scrapbook files to add or change scrapbooking elements within the entire album or on individual pages of the album. By way of non-limiting examples, the user can select a border for a page and/or individual media file 904 from a selection of borders, such as scalloped edging, waves, stripes, or other types of borders. The user can add clip art to pages and/or media files 904, for example adding images of scenery or props. By way of a non-limiting example, the user can add costuming images such as mustaches, hats, glasses, hair, or other elements at desired locations on individual images.

The user can add preselected or customized shapes, colors, glitter patterns, or other elements to an album page, background, or individual images. Text and/or captions can be added to the album pages on the background and/or on top of digital images. Text can be selected from a preselected library, a downloadable library, or be entered by the user through an on-screen keyboard or other input mechanism 110. The font, font size, and color of text can be customized with color wheels, color pickers, font selectors, drop-down boxes, or other selectors. In some embodiments, the user can add bubble quotes to album pages and/or individual images, by selecting a quote from a preselected library, downloadable library, or entering in customized text. The colors of the bubble quote's interior and border can be changed, as can the font, font size, and font color of the text. Downloadable libraries of text, captions, and/or quotes can be accessible through the photo album device 100. For example, a user can search for quotes suitable for events or themes such as "Father's Day," "Love," "Summer," or any other event or theme.

The photo album device 100 can have or access preinstalled or downloadable themes of scrapbook files 908. By way of non-limiting examples, themes of backgrounds, clip art, quotes, layouts, and other scrapbook files 908 for different holidays can be available, such as themes for Christmas, Valentine's Day, 4th of July, Halloween, Thanksgiving, New Year's Eve/Day, and Hanukah.

The photo album device 100 can have selectable buttons, gestures, or other user interface elements that allow the user to cut, copy, delete, or paste media files 904 and/or scrapbook files 908 within albums, or to undo their last action. Other interface elements can allow the user to selectively share albums or individual media files 904 with friends or family over social networks or email, or to backup their work to the backup device at step 806. In some embodiments, backup of files can occur periodically without user interaction.

When not editing albums, users can select albums to view on the screens 104. Users can tap or swipe their finger across either screen 104 move between pages of the album, or use hardware buttons on the photo album device 100 to change pages. Users can use volume buttons on the photo album device 100 to change the volume of the device.

Figure 10:
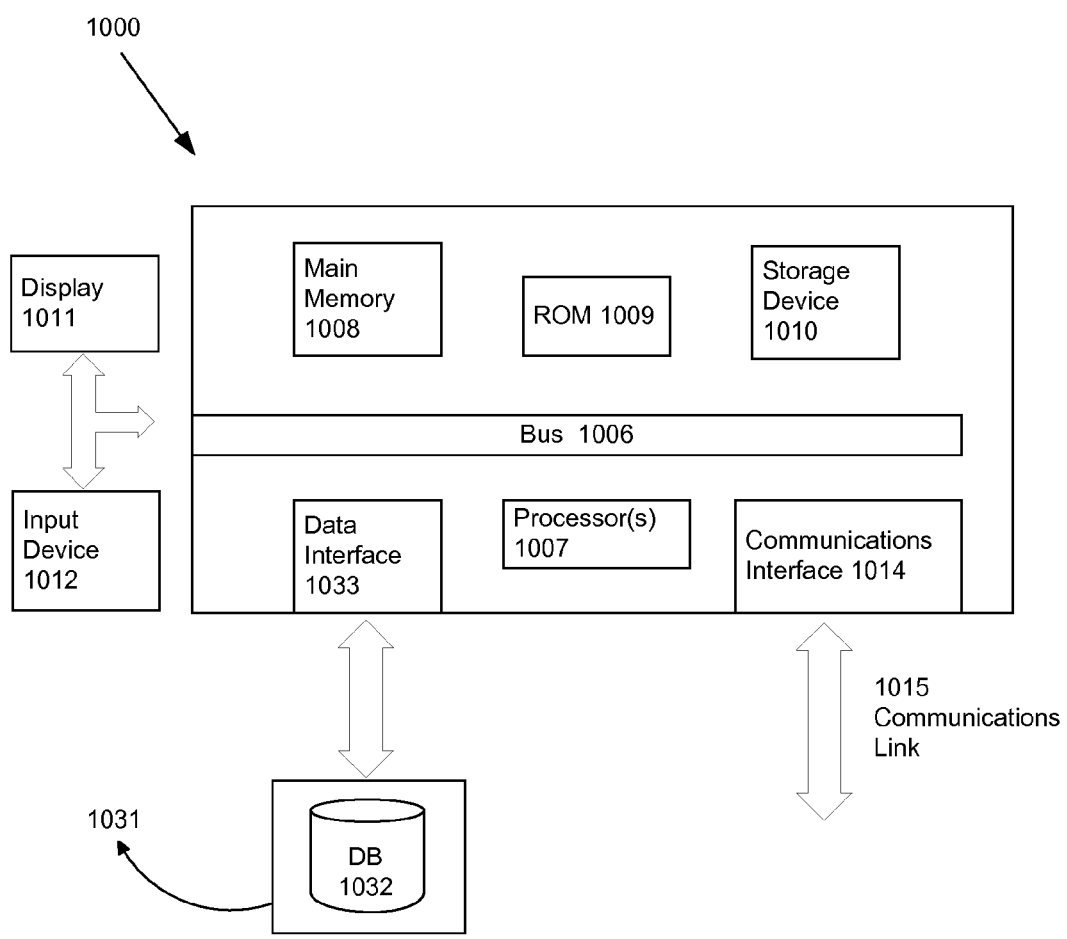
FIG. 10 depicts a computer system capable of running embodiments of the system.

The execution of the sequences of instructions required to practice the embodiments may be performed by a computer system 1000 as shown in FIG. 10. In an embodiment, execution of the sequences of instructions is performed by a single computer system 1000. According to other embodiments, two or more computer systems 1000 coupled by a communication link 1015 may perform the sequence of instructions in coordination with one another. Although a description of only one computer system 1000 will be presented below, however, it should be understood that any number of computer systems 1000 may be employed to practice the embodiments.

A computer system 1000 according to an embodiment will now be described with reference to FIG. 10, which is a block diagram of the functional components of a computer system 1000. As used herein, the term computer system 1000 is broadly used to describe any computing device that can store and independently run one or more programs.

Each computer system 1000 may include a communication interface 1014 coupled to the bus 1006. The communication interface 1014 provides two-way communication between computer systems 1000. The communication interface 1014 of a respective computer system 1000 transmits and receives electrical, electromagnetic or optical signals, that include data streams representing various types of signal information, e.g., instructions, messages and data. A communication link 1015 links one computer system 1000 with another computer system 1000. For example, the communication link 1015 may be a LAN, in which case the communication interface 1014 may be a LAN card, or the communication link 1015 may be a PSTN, in which case the communication interface 1014 may be an integrated services digital network (ISDN) card or a modem, or the communication link 1015 may be the Internet, in which case the communication interface 1014 may be a dial-up, cable or wireless modem.

A computer system 1000 may transmit and receive messages, data, and instructions, including program, i.e., application, code, through its respective communication link 1015 and communication interface 1014. Received program code may be executed by the respective processor(s) 1007 as it is received, and/or stored in the storage device 1010, or other associated non-volatile media, for later execution.

In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 1033, which is coupled to the bus 1006, transmits and receives electrical, electromagnetic or optical signals, that include data streams representing various types of signal information, e.g., instructions, messages and data. In embodiments, the functions of the data interface 1033 may be performed by the communication interface 1014.

Computer system 1000 includes a bus 1006 or other communication mechanism for communicating instructions, messages and data, collectively, information, and one or more processors 1007 coupled with the bus 1006 for processing information. Computer system 1000 also includes a main memory 1008, such as a random access memory (RAM) or other dynamic storage device, coupled to the bus 1006 for storing dynamic data and instructions to be executed by the processor(s) 1007. The main memory 1008 also may be used for storing temporary data, i.e., variables, or other intermediate information during execution of instructions by the processor(s) 1007.

The computer system 1000 may further include a read only memory (ROM) 1009 or other static storage device coupled to the bus 1006 for storing static data and instructions for the processor(s) 1007. A storage device 1010, such as a magnetic disk or optical disk, may also be provided and coupled to the bus 1006 for storing data and instructions for the processor(s) 1007.

A computer system 1000 may be coupled via the bus 1006 to a display device 1011, such as, but not limited to, a cathode ray tube (CRT) or an LCD monitor, for displaying information to a user. An input device 1012, e.g., alphanumeric and other keys, is coupled to the bus 1006 for communicating information and command selections to the processor(s) 1007.

According to one embodiment, an individual computer system 1000 performs specific operations by their respective processor(s) 1007 executing one or more sequences of one or more instructions contained in the main memory 1008. Such instructions may be read into the main memory 1008 from another computer-usable medium, such as the ROM 1009 or the storage device 1010. Execution of the sequences of instructions contained in the main memory 1008 causes the processor(s) 1007 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1007. Such a medium may take many forms, including, but not limited to, non-volatile, volatile and transmission media. Non-volatile media, i.e., media that can retain information in the absence of power, includes the ROM 1009, CD ROM, magnetic tape, and magnetic discs. Volatile media, i.e., media that can not retain information in the absence of power, includes the main memory 1008. Transmission media includes coaxial cables, copper wire and fiber optics, including the wires that comprise the bus 1006. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner. Further, the storage elements of the exemplary computing applications may be relational or sequential (flat file) type computing databases that are capable of storing data in various combinations and configurations.

Although exemplary embodiments of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A photo album device, comprising:
    two panels each comprising a touchscreen, wherein said two panels are hingeably coupled with one another;
    at least one memory storage device housed within at least one of said panels, said at least one memory storage device being configured to store one or more media files and one or more scrapbook files;
    a microphone coupled with at least one of said two panels and said at least one memory storage device, wherein audio recorded by said microphone is stored on said at least one memory storage device as one of said one or more media files; and
    a system operable through the touchscreens of said two panels, said system being configured to:
        group said one or more media files into albums on said at least one memory storage device, wherein said system creates default albums based on chronological organization of said one or more media files according to metadata associated with said one or more media files;
        accept instructions from a user to rearrange said one or more media files within or across said albums;
        accept instructions from a user to create and/or edit scrapbook collections stored on said at least one memory storage device, each said scrapbook collection being a visual layout of a subset of said one or more media files and said one or more scrapbook files; and
        begin an audio recording with said microphone when a user touches one of said touchscreens for a predetermined period of time while viewing one of said scrapbook collections, wherein said system associates a resulting audio media file with said scrapbook collection.

2. The photo album device of claim 1, further comprising a data transmission component configured to be in data communication with an external data storage device, wherein said photo album device is configured to backup said albums, said media files and said scrapbook files to said external data storage device.

3. The photo album device of claim 2, wherein said photo album device is configured to store versions of said media files that are optimized for the resolution of said panels' touchscreens on said at least one memory storage device and to backup the original versions of said media files to said external data storage device, and is configured to retrieve said original versions during editing of said media files or said album files.

4. The photo album device of claim 2, wherein said external data storage device is a cloud storage device accessible over the internet.

5. The photo album device of claim 1, wherein each said panel further comprises a corresponding closure device configured to selectively couple with one another to maintain the photo album device in a closed configuration.

6. The photo album device of claim 1, wherein said system is configured to generate new albums by searching for one or more media files that include images of a particular person.

7. The photo album device of claim 1, wherein said system is configured to accept instructions from a user to select and add one or more scrapbook files to one of said albums to create a new scrapbook collection.

8. The photo album device of claim 1, wherein said system is configured to accept instructions from a user to edit one or more media files associated with one of said albums.

9. The photo album device of claim 1, wherein said system is configured to selectively share one or more of said media files with a separate photo album device.

10. The photo album device of claim 1, wherein said system is configured to accept instructions from a user to associate one or more music files with a particular scrapbook collection.

11. The photo album device of claim 1, wherein when said system is configured to play video media files full screen across both of said two panels.

* * * * *